(12) United States Patent
Kessler

(10) Patent No.: US 6,622,447 B1
(45) Date of Patent: Sep. 23, 2003

(54) MODULAR HUB AND STRUT STRUCTURAL SYSTEM

(76) Inventor: Steven Crawford Kessler, 65 Via Pamplona, Rancho Santa Margarita, CA (US) 92688

(*) Notice: Subject to any disclaimer, the term of this patent is extended or adjusted under 35 U.S.C. 154(b) by 266 days.

(21) Appl. No.: 09/721,833

(22) Filed: Nov. 24, 2000

Related U.S. Application Data

(63) Continuation-in-part of application No. 09/271,064, filed on Mar. 17, 1999, now abandoned, which is a continuation-in-part of application No. 08/754,523, filed on Nov. 21, 1996, now Pat. No. 6,286,283.

(51) Int. Cl.[7] .............................. E04B 1/19; E04B 1/38; A63H 33/08
(52) U.S. Cl. ....................... 52/655.2; 52/656.9; 52/779; 52/780; 403/171; 403/217; 403/381; 446/125; 446/126; 446/127
(58) Field of Search .............................. 52/656.9, 655.1, 52/655.2, 81.3, 764, 734.1, DIG. 10, DIG. 17, 474, 762, 763, 766, 779, 780; 403/217, 170, 171, 169, 381; 446/125, 126, 127

(56) References Cited

U.S. PATENT DOCUMENTS

| 856,838 A | 6/1907 | Bell et al. |
|---|---|---|
| 2,936,530 A | 5/1960 | Bowen |
| 3,600,825 A | 8/1971 | Pearce |
| 3,688,461 A | 9/1972 | Rensch |
| 3,877,138 A | * 4/1975 | Suchowski |
| 4,078,328 A | 3/1978 | Rayment |
| 4,129,975 A | 12/1978 | Gabriel |
| 4,159,592 A | 7/1979 | Gabriel |
| D254,752 S | 4/1980 | Gabriel |
| D255,472 S | 6/1980 | Gabriel |
| D257,270 S | 10/1980 | Gabriel |
| D257,271 S | 10/1980 | Gabriel |
| D257,365 S | 10/1980 | Gabriel |
| D257,366 S | 10/1980 | Gabriel |
| 4,247,218 A | 1/1981 | Jennin |
| 4,275,524 A | 6/1981 | Gabriel |
| D260,790 S | 9/1981 | Gabriel |
| 4,432,661 A | 2/1984 | Phillips et al. |

(List continued on next page.)

FOREIGN PATENT DOCUMENTS

| DE | 801441 | 1/1951 |
|---|---|---|
| DE | 2100874 | 7/1972 |

*Primary Examiner*—Robert Canfield
(74) *Attorney, Agent, or Firm*—Stout, Uxa, Buyan & Mullins, LLP; Donald E. Stout

(57) ABSTRACT

A modular structural system for building models and structures. The system comprises a plurality of connector hub members each having spherical symmetry, and a plurality of strut members having longitudinal symmetry, wherein, each of the connector hub members provides a strut joining feature adapted for receiving the strut members, and each of the strut members provides a hub joining feature adapted for engaging the strut joining feature of the connector hub members, such that the strut members are removably engagable with the connector hub members in alternative first and second positions placing the strut members in corresponding radial and tangential positions relative to the connector hub members.

25 Claims, 10 Drawing Sheets

U.S. PATENT DOCUMENTS

| | | |
|---|---|---|
| 4,449,843 A | 5/1984 | Wendle |
| 4,610,561 A | 9/1986 | Cecchellero et al. |
| 4,637,180 A | 1/1987 | Zeigler |
| 4,838,003 A | 6/1989 | Zeigler |
| 4,932,808 A | 6/1990 | Bar et al. |
| 4,941,763 A | 7/1990 | Euteneuer |
| 5,061,219 A | 10/1991 | Glickman |
| RE33,785 E | 12/1991 | Hildebrandt et al. |
| 5,074,094 A | 12/1991 | Gassler |
| 5,097,645 A | 3/1992 | Sanderson |
| 5,137,486 A | 8/1992 | Glickman |
| 5,145,441 A | 9/1992 | Hsun |
| 5,199,919 A | 4/1993 | Glickman |
| 5,238,438 A | 8/1993 | Glickman |
| 5,282,767 A | 2/1994 | Gelardi |
| 5,318,470 A | 6/1994 | Denny |
| 5,368,514 A | 11/1994 | Glickman et al. |
| 5,431,211 A | 7/1995 | Guillemet |
| 5,542,871 A | 8/1996 | Gabriel |
| 5,556,219 A | 9/1996 | Mason |
| D377,061 S | 12/1996 | Gabriel |
| D377,062 S | 12/1996 | Gabriel |
| D377,671 S | 1/1997 | Gabriel |
| D378,106 S | 2/1997 | Gabriel |
| 5,599,221 A | 2/1997 | Gabriel |
| D380,787 S | 7/1997 | Gabriel |
| D380,788 S | 7/1997 | Gabriel |
| D380,789 S | 7/1997 | Gabriel |
| D380,790 S | 7/1997 | Gabriel |
| D380,791 S | 7/1997 | Gabriel |
| D380,792 S | 7/1997 | Gabriel |
| 5,802,798 A | 9/1998 | Martens |
| 6,004,182 A | 12/1999 | Pasin |
| 6,089,941 A | 7/2000 | Glickman et al. |

* cited by examiner

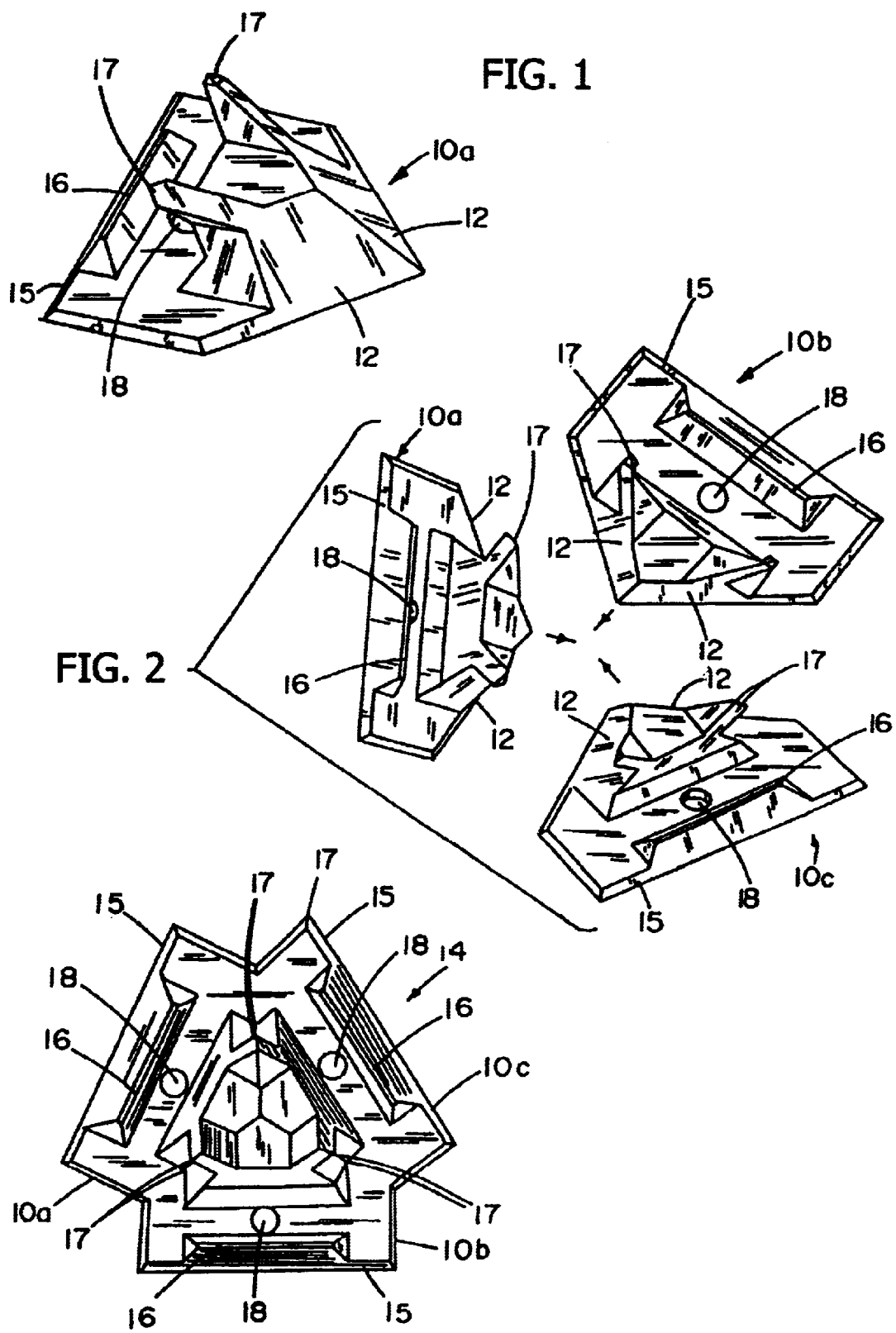

MODULAR HUB AND STRUT STRUCTURAL SYSTEM

CROSS-REFERENCE TO RELATED APPLICATIONS

This application is a continuation-in-part under 35 U.S.C. 120, parent application Ser. No. 09/271,064, filed Mar. 17, 1999 and now abandoned, which in turn was a continuation-in-part under 35 U.S.C. 120 of parent application Ser. No. 08/754,523, filed on Nov. 21,1996, and now U.S. Pat. No. 6,286,283.

BACKGROUND OF THE INVENTION.

This invention relates in general to modular structural systems, and in particular to a modular hub and strut structural system embodying connector hub members having a plurality of connector sites such as projections with adjacent protuberances or as strut accommodation cavities radiating from a common site, with each connector site for engaging an end of a strut member and arranged in a plurality of planes such that the hub and strut structural system can be employed in building structural models or in building actual structures which may also include those utilized in fluid or energy conveyance.

Many times the design of a structure includes acute and oblique angularity coupled with cross sectional uniformity of structurally significant portions which consequently require complimentary structural systems to maintain stable construction integrity. In particular, a plurality of course directions from a single hub site can be desired, with such directions exemplified by strut structures, that may or may-not function as anchor sites for panels or the like, to project from the hub site through a number of planes to thereafter terminate at an end site or to engage with yet another hub site from which additional strut structures project. Not only may a real life structure require such angularity and cross sectional uniformity, but also does any model of a structure that is constructed as an aid or guide in studying or otherwise observing or displaying this structure. Also, besides construction considerations, hollow struts could be employed as fluid or energy conduits for fluid or energy traveling from a central hub location to a remote location, with passageways of the hub being registrable with complimentary passageways through the struts. Additionally, and beyond actual building construction, the design and assembly of structural models, whether for subsequent actual building design, for researching design feasibilities and appearances, or simply for amusement, require flexibility and variety in choices of structural presentation.

Since prior art structural systems lack significant options for structural design choices, it is apparent that a need is present for a modular structural system wherein a wide variety of representations of designs as well as actual designs can be readily provided. Accordingly, a primary object of the present invention is to provide a modular structural system employing connector hub members having a plurality of strut member engagement components arranged in a plurality of planes such that choices of strut member assignment and direction can be numerous while cross sectional configurations of engagement components and strut members are identical at sites of respective interfaces.

Another object of the present invention is to provide a modular structural system wherein such strut members and connector hub members can be weight bearing in a building construction or they can function as fluid or energy conduits with registrable passageways such that fluids or energy can be conveyed within an assembled system.

Still another object of the present invention is to provide a modular structural system wherein the strut members can function as anchor sites for panels and the like in finished construction.

Yet another object of the present invention is to provide a modular structural system wherein strut members and connector hub members are sized to enable the construction of models' for experimentation in structural as well as aesthetic design.

These and other objects of the present invention will become apparent throughout the description of the invention which now follows.

BRIEF SUMMARY OF THE INVENTION

The present invention is a modular structural system for building structural models or for constructing actual structures. One embodiment of the system comprises, first of all, at least one connector hub member comprising a plurality of projections arranged in a plurality of planes each for engaging an end of a strut member, with all projections having cross sectional geometries identical with cross sectional geometries of attached strut members at sites of respective attachments. Second, the system comprises at least one strut member having a first end and a second end, with each end comprising an engageable portion for engagement-with a projection of the connector hub member. The strut member has a strut cross-sectional geometry identical to and in alignment with the cross-sectional geometry of a projection and adjacent protuberances of the, hub member when the strut member is engaged with the projection. Such cross-sectional geometry can be chosen as desired or required for any particular application, with the singular requirement being that cross-sectional strut geometry and cross sectional hub geometry are the same at the site of interface. Retention members are included for securing the respective ends of the strut members with the projections of the connector hub members. One preferable securement is that wherein each projection of the connector hub member and each slidingly engageable portion of the strut member have apertures that register with each other upon engagement of the projection and the engageable portion with each other, with the retention member being a pin placeable within the registered apertures. Of course; other retention means, such as would be non-limitedly exemplified through a detente favorably situated along respective engagement surfaces of a hub member and a strut member, can accomplish such retention. The strut members can have along their respective exposed surfaces flanges of the like capable of accepting and retaining panels or other finishing construction material.

The hub member can be of one piece molded construction, for example, or, as in one preferred embodiment, the hub member is constructed from a plurality of geometrically identical units bonded to each other to form the plurality of identical projections and protuberances. Specifically, each such geometrical unit of the connector hub member comprises a plurality of identical geometrical components bonded to each other wherein two such units form a cross section of the projection and adjacent protuberances, wherein the projection engages the end of one strut member. Because each geometrical unit has at least one surface area, preferably a generally planar surface area, that is complimentary to at least one surface area of another geometrical unit, a bonding site is thereby provided for bonding respective units together and forming the particular cross section.

Various units can be chosen to construct various cross sectional geometries as desired to thereby be identical at respective sites of engagement with cross sectional geometries of chosen strut members engageable with the connector hub members as described above.

In a second preferred embodiment, the modular structural system comprises at least one connector hub member having a core and a plurality of cavities arranged in a plurality of planes. Each cavity has first and second opposing side walls and a floor, and is accessible through an open side thereof. Above the first and second side walls are first and second opposing flanges that project toward each other from respective first and second flange plates. The system further includes at least one strut member having two opposing lateral lengths along with two opposing inner lengths between the lateral lengths, and a first and second end. Each end of the strut has an engageable portion disposed thereat for engagement within a cavity of the connector hub member. This engageable portion has first and second grooves to slidingly capture the first and second opposing flanges of the cavity, and is complimentary in shape to the cavity side walls while of a size to frictionally engage the side walls. Each strut member has a strut cross-sectional geometry substantially identical to and in alignment with the cross-sectional geometry of the floor of the cavity when the engageable portion of the strut end is engaged within the cavity.

As is apparent, the present invention provides a modular structural system employing connector hub members having a plurality of strut member engagement sites arranged in a plurality of planes that provide a plurality of cooperating geometries at sites of engagement, thereby affording a myriad of choices of strut member assignment and direction, whether for construction, fluid transmission, energy distribution, model making, or amusement. The external geometries of the strut members smoothly blend into the matching geometries of the connector hub members to thereby eliminate any interference with each other as a construction is being formed. When such external geometry of the strut members includes flanges that blend into an identical geometry of a connector hub member at sites of engagement, these flanges can readily be employed as anchor sites for accepting panels or the like in providing construction designs.

BRIEF DESCRIPTION OF THE SEVERAL VIEWS OF THE DRAWINGS

An illustrative and presently preferred embodiment of the invention is shown in the accompanying drawings in which:

FIG. 1 is a perspective view of a first embodiment of a geometrical component for constructing a geometrical unit of a connector hub member;

FIG. 2 is a perspective view illustrating an assembly step of three of the components illustrated in FIG. 1;

FIG. 3 is a plan view of a completed assembly formed as illustrated in FIG. 2;

FIG. 9b is a perspective view of a modification of the hub member of FIG. 9a;

FIG. 10b is a perspective view of a modification of the strut member of FIG. 10a;

FIG. 13 is an exploded perspective view of a first modification of the strut of FIG. 10a;

FIG. 14 is a perspective view of a portion of a second modification of the strut of FIG. 10a;

DETAILED DESCRIPTION OF THE INVENTION

Figure 4:
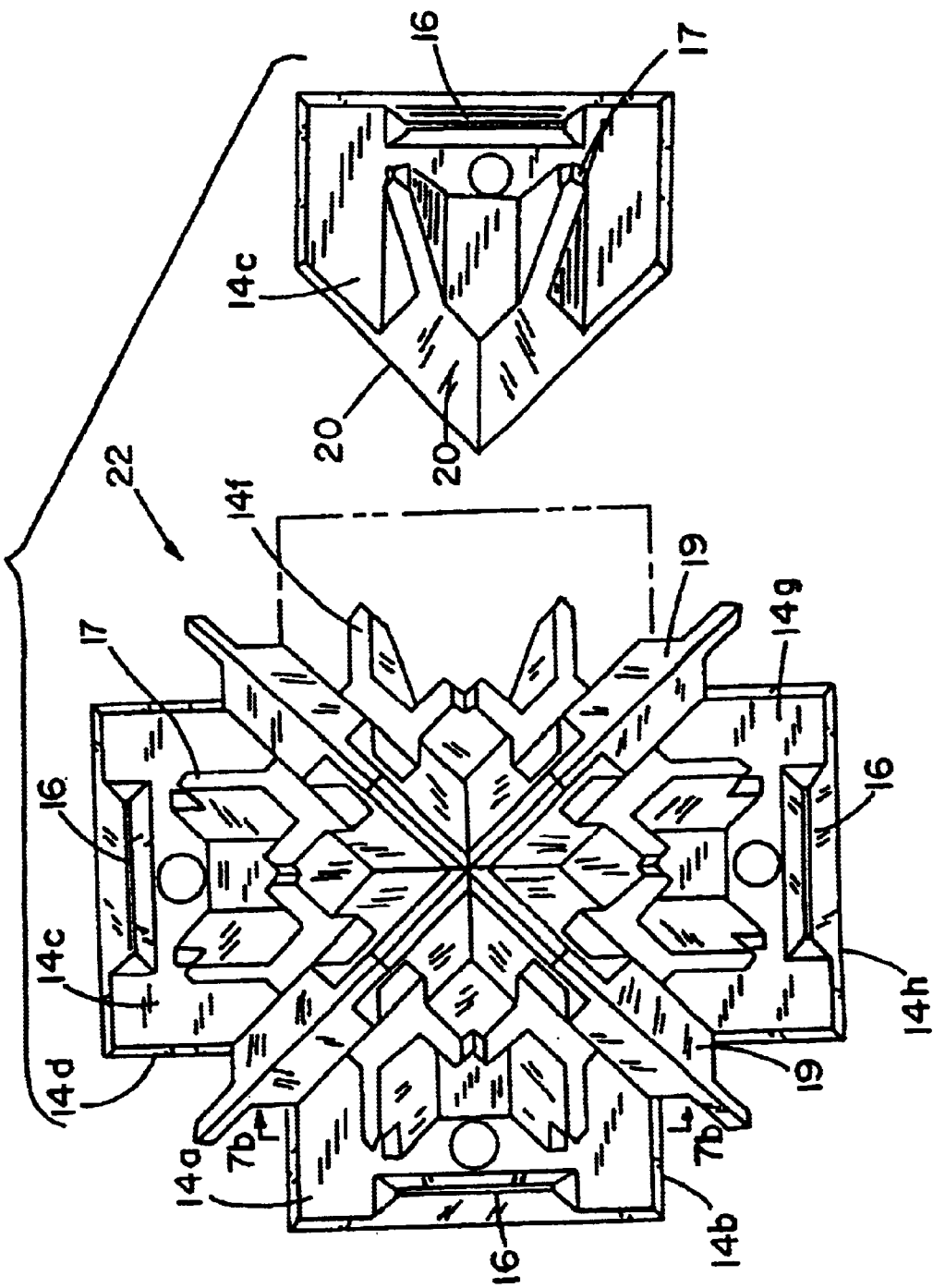
FIG. 4 is a plan view of a connector hub member of the first embodiment with one geometrical component broken away.

Referring to FIGS. 1–3, three identical geometrical components 10a, 10b, 10c, each having planar surface areas 12, are assembled as illustrated in FIG. 2 by being permanently bonded as with adhesive to each other along adjacent planar surface areas 12 to form a geometrical unit 14 shown in FIG. 3. While individual components are joined to each other to form the unit 14, it is to be understood that such a unit can also be of one-piece molded construction. Near the outer edge 15 of each component 10a, 10b, 10c is an A-shaped flange 16 and an aperture 18 disposed interiorly from the flange 16 while symmetrically positioned opposing protuberances 17 project upwardly and outwardly.

In order to construct a non-molded connector hub member, a plurality of units 14 are joined to each other to thereby form a plurality of identical projections in a plurality of planes for engaging respective ends of strut members. The units 14 are joined such that two flanges 16 are in back-to-back alignment and project outwardly to create a flange 16 on each side of two joined units 14 thereby forming a projection 19 while respective apertures 18 are in registration with each other. FIG. 4 shows eight units 14a, 14b, 14c, 14d, 14e, 14f, 14g, 14h bonded with adhesive to each other along generally planar complimentary surface areas to form a connector hub member 22. Specifically, unit 14a has bonded thereto and immediately behind it identical unit 14b. Likewise, units 14c and 14d, units 14e and 14f, and units 14g and 14h are respectively bonded to each other, as are all laterally adjacent units bonded to each other (e.g. units 14a and 14c; units 14b and 14d). Once again, while units are bonded to each other to form a hub member, it is to be understood that hub members can also be of one-piece molded construction. Twelve projections 19 thus are formed by 12 respective pairs of back-to-back aligned flanges 16 as earlier described.

Figure 6:
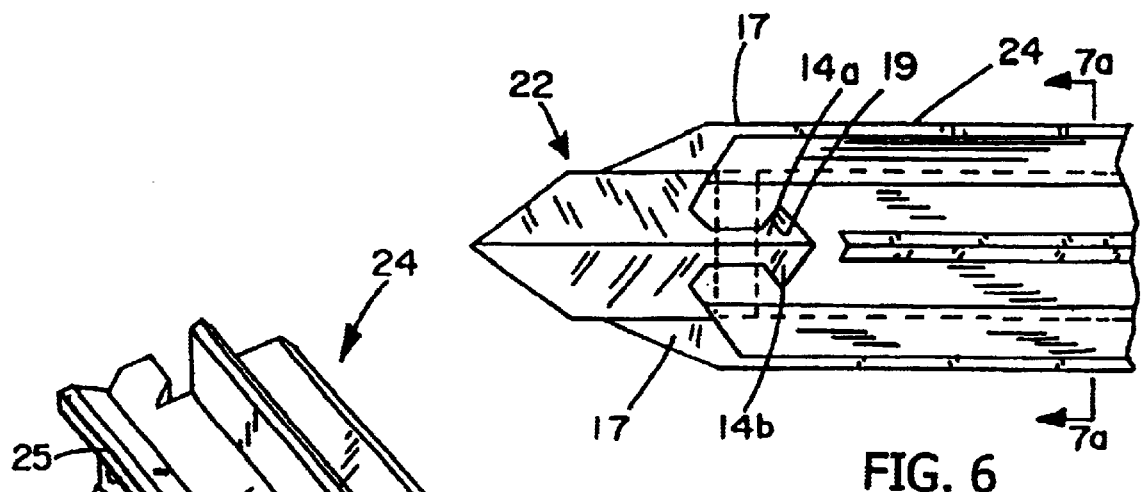
FIG. 6 is a partial side elevational view of the strut member of FIG. 5 engaged with a projection of a connector hub member.
Figure 5:
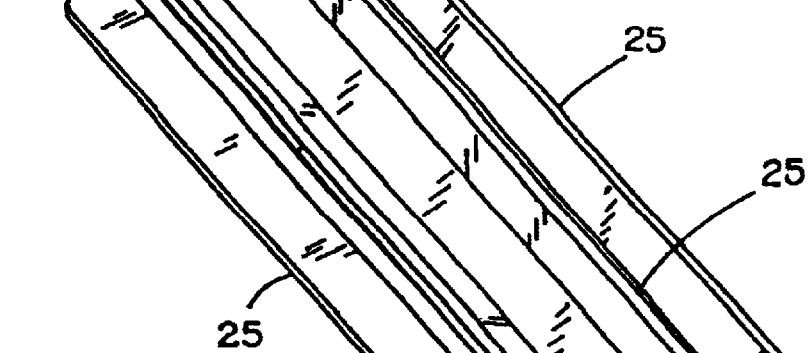
FIG. 5 is a perspective view of a first embodiment of a strut member.
Figure 7A:
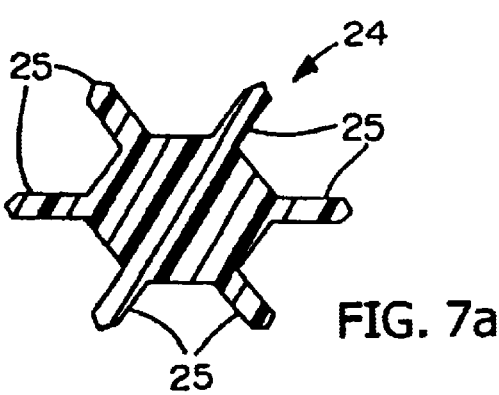
FIG. 7a is a sectional view along line 7a—7a of FIG. 6.
Figure 7B:
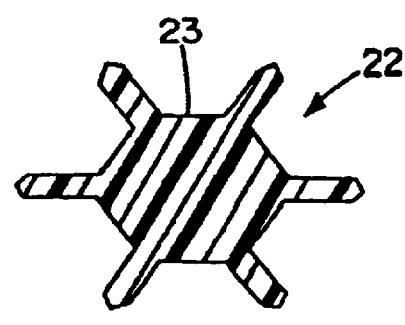
FIG. 7b is a section view along line 7b—7b of FIG. 4.

FIGS. 5 and 7a show a strut member 24 having strut flanges 25 along its exterior surface and having at each end thereof an open jaw structure 26 forming a channel 28 and having aligned apertures 30, 32. The channel 28 can slidingly engage a projection 19 and be retained in place with a pin 34 disposed within the apertures, 30, 18, 32. FIG. 6 shows such securement, with aligned flanges 16 of units 14a and 14b of connector hub member 22 forming a projection 19 disposed within the channel 28 and there retained with the pin 34 in place through the apertures 30, 18, 32. Cross-section geometry of the strut 24 as shown in FIG. 7a is identical to cross-section geometry of the projection 19 along with interfacing protuberances 17 shown in FIG. 7b of the connector hub member 22 as it would be in alignment with a strut 24 connected thereto. Specifically, the connector hub member 22 shown in FIG. 4 is a 12-way connector member capable of engaging twelve strut members 24, with direction possibilities defined in a Cartesian coordinate system where positive X is to the right, positive Y is toward the top of the drawing sheet, and positive Z comes from the sheet toward the viewer. The twelve possibilities, where the first number is an angle in the XY plane and the second number is an angle from the XY plane in Z, are as follows: (1) 0 degree, 0 degree; (2) 90 degree, 0 degree; (3) 180 degree, 0 degree; (4) 270 degree, 0 degree; (5) 45 degree, 45 degree; (6) 135 degree, 45 degree; (7) 225 degree, 45 degree; (8) 315 degree, 45 degree; (9) 45 degree, −45 degree; (10) 135 degree, −45 degree; (11) 225 degree, 45 degree; and (12) 315 degree, −45 degree.

Figure 7C:
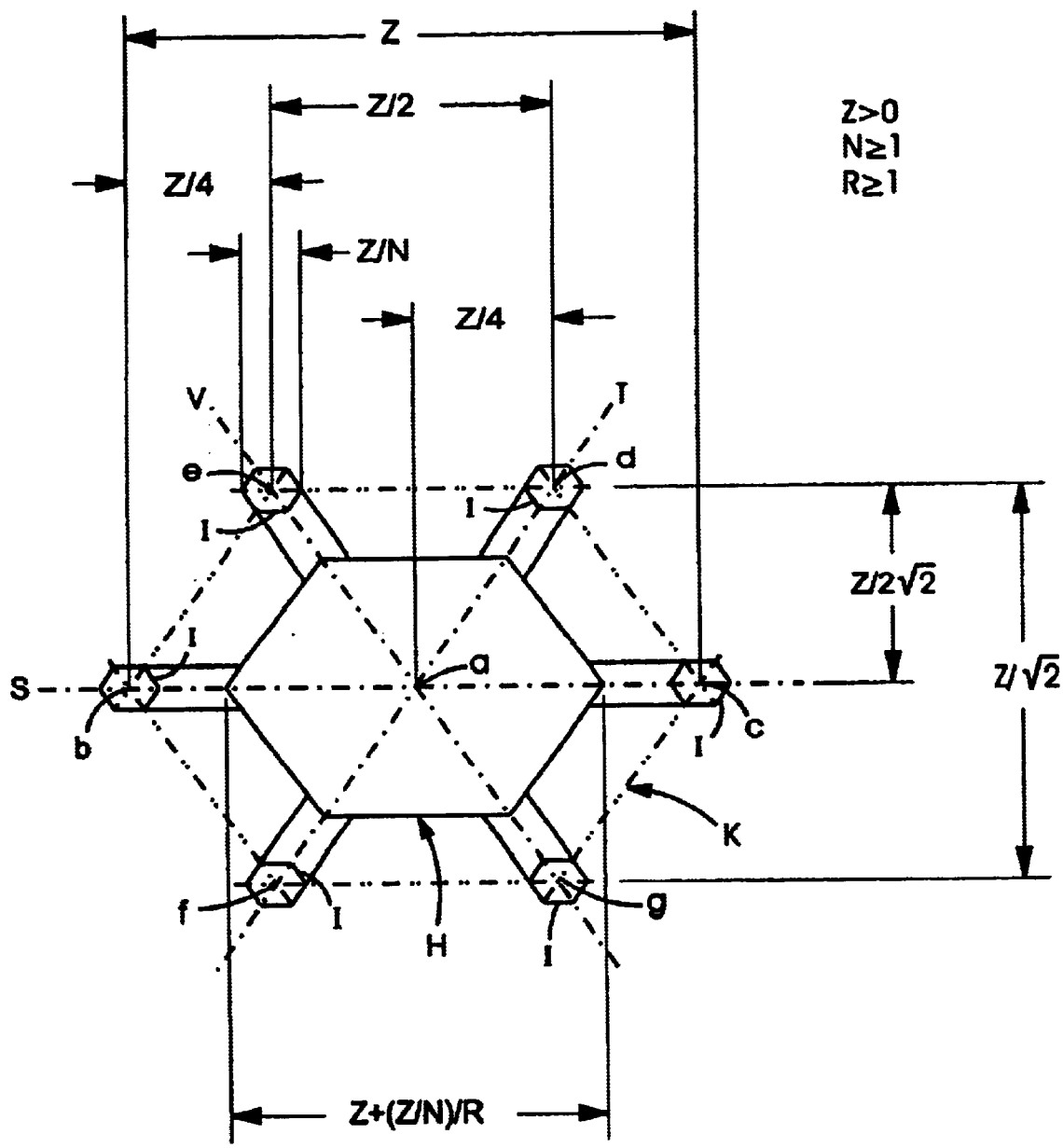
FIG. 7c illustrates a mathematical relationship among the strut flanges and a hub member projection of FIG. 1 with adjacent protuberances.

FIG. 7c illustrates the spatial relationship of the flanges 25 of the preferred embodiment as well as the spatial relationship of a hub member projection 19 and adjacent protuberances 17, and takes into account specific cross sectional and size relationships depending upon construction requirements. Specifically, the preferred embodiment is formed uniformly along respective axes as described below. Thus, axis S includes points a, b and c, with points b and c equidistant from point a. The distance between points b and c is Z where Z is greater than zero.

Axis T is defined by points a, d and f, where point d has a horizontal distance of Z/4 from point a and a vertical distance $(Z/2)*2^{1/2}$ from point a. Point f has a vertical distance $Z*2^{1/2}$ from point d and a horizontal distance Z/2 from point d. Mirrored about axis S are points d and f that have counterparts, points g and e respectively, with axis V defined by points g and e.

As shown in phantom in FIG. 7c, polygon K is thus formed by points b, e, d, c, g, and f, with an overall horizontal dimension of Z. Each of the outer portions of the six flanges of the preferred embodiment are defined by polygon I formed uniformly about points b, e, d, c, g, and f similarly as polygon K is formed about point a. Polygon I has an overall horizontal dimension of Z/N where N is equal to or greater than one. Similarly, the exposed sides of the central core of the preferred embodiment are defined by polygon H formed uniformly about point a. Polygon H has an overall horizontal dimension of Z+(Z/N)/R, where R is equal to or greater than one. As is thus apparent, polygons I and H define actual external configurations that are spatially completed in accord with dimensioning as shown in the phantom lines of FIG. 7c.

Figure 8:
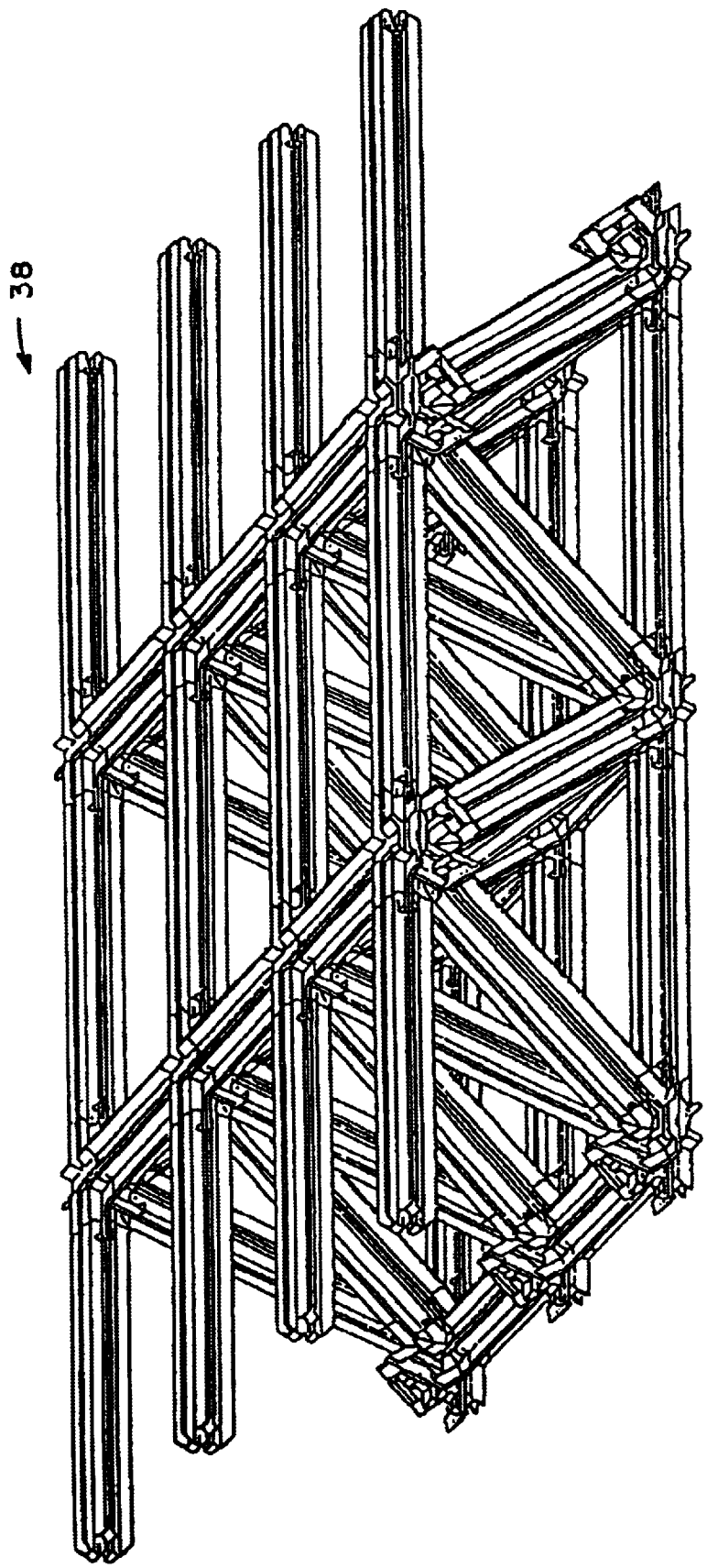
FIG. 8 is a perspective view of a modular structure employing the first embodiment of the invention as shown in FIG. 1.

Because both the strut flanges 25 and hub member projections 19 with respective adjacent protuberances 17 cross-sectionally follow the above mathematical pattern, both strut and connector geometries are identical for both structural integrity and utility of strut member and connector hub member in indoor and outdoor building construction, model making, and the like. Cross sectional geometries can be chosen as desired as long as strut and connector geometries are alike to thereby eliminate any interference with each other as a construction is being formed utilizing smooth transitions from strut members to connector hubs. Thus, while the preferred embodiment shows a connector hub member 22 capable of accepting 12 struts members 24, other hub members of differing geometries can be constructed to accept fewer strut members having complimentary cross sectional geometries. The modular structure 38 of FIG. 8 is included to exemplify diversity of construction while providing identical cross sectional geometries of strut members and connector member projections with adjacent protuberances that are in-line with each other. For a fluid-transmission embodiment of the modular structural system, as non-limitedly exemplified in the delivery of utility products such as gas, water, etc., the connector hub members and the strut members can be provided with passageways therethrough registrable with each other to thereby permit such fluid passage and its delivery to a remote site.

Figure 9A:
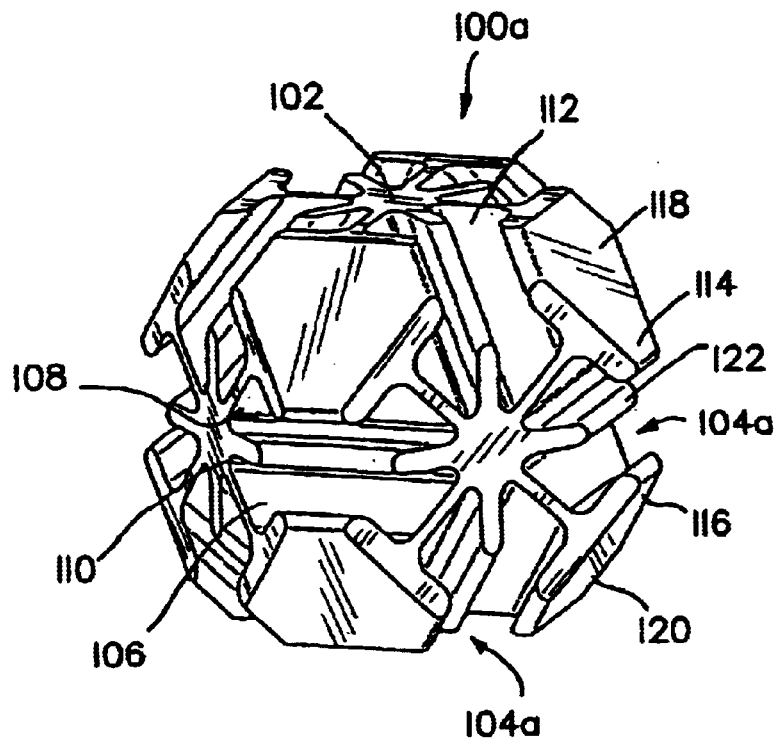
FIG. 9a is a perspective view of a hub member of a second embodiment of the invention.
Figure 9B:
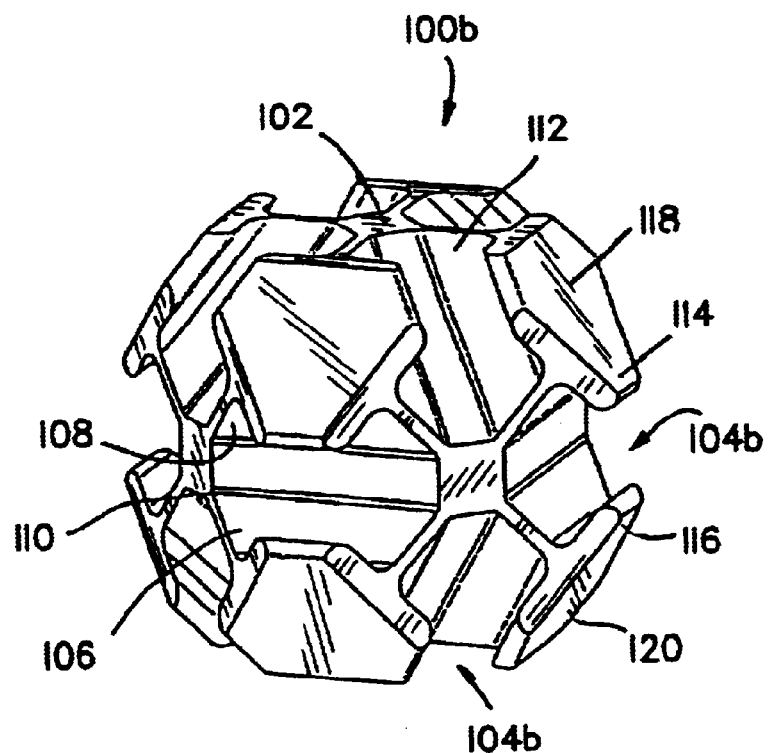
Figure 10A:
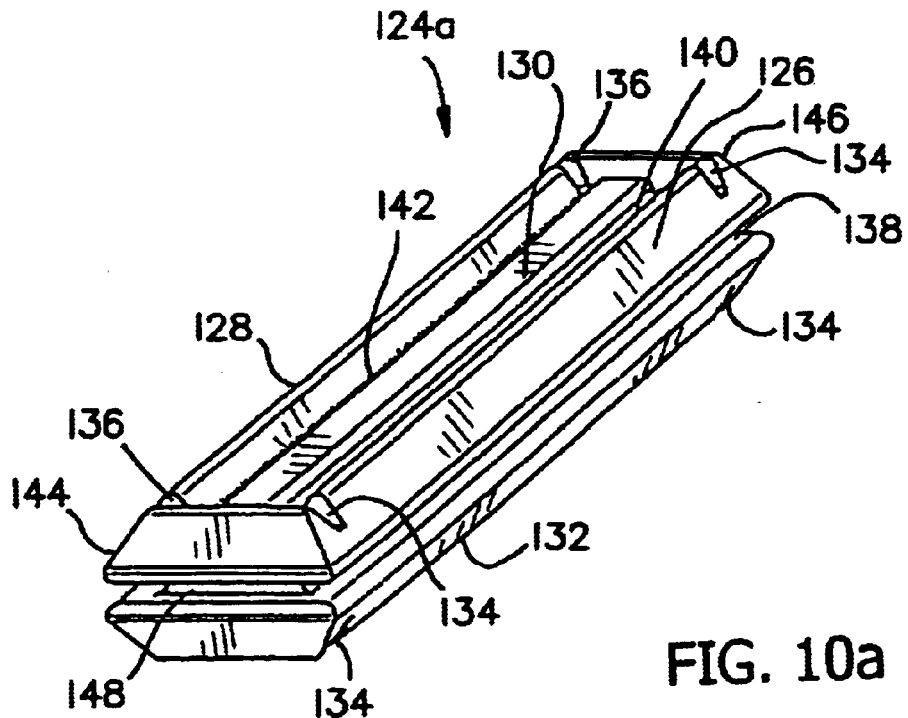
FIG. 10a is a perspective view of a strut member of the second embodiment.
Figure 10B:
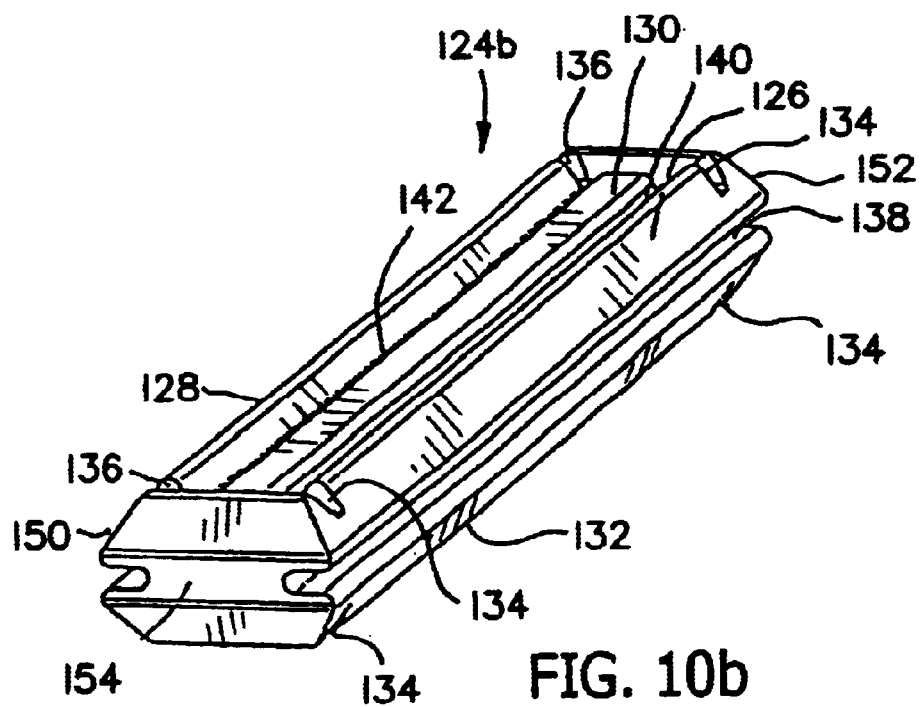

Referring now to FIGS. 9a, 9b, 10a, 10b, and 11, a second embodiment of the modular structural system is illustrated. Specifically, in FIGS. 9a and 9b, respective connector hub members 100a, 100b are shown. The hub members 100a, 100b each comprise a core 102 and a plurality of cavities 104a, 104b, each having first and second opposing side walls 106, 108 and a floor 110. Access to the cavity 104a, 104b is through side openings 112. Above each side wall 106, 108 are first and second opposing flanges 114, 116 projecting toward each other from respective first and second flange plates 118, 120. The hub member 100a has projecting outwardly from its floor 110 a floor flange 122. FIGS. 10a and 10b illustrate strut members 124a, 124b for respective engagement with hub members 100a, 100b. The strut member 124a, 124b has two identical opposing lateral lengths 126, 128, first and second grooves 134, 136 at each end, a lateral groove 138 along each lateral length 126, 128, and two inner-length grooves 140, 142. The first and second ends 144, 146 of the strut 124a each have a groove 148, while the first and second ends 150, 152 of the strut 124b have a substantially flat central surface 154. End surface planes are complimentary in configuration to the side walls 106, 108 of the hub member 100a, 100b.

Figure 11:
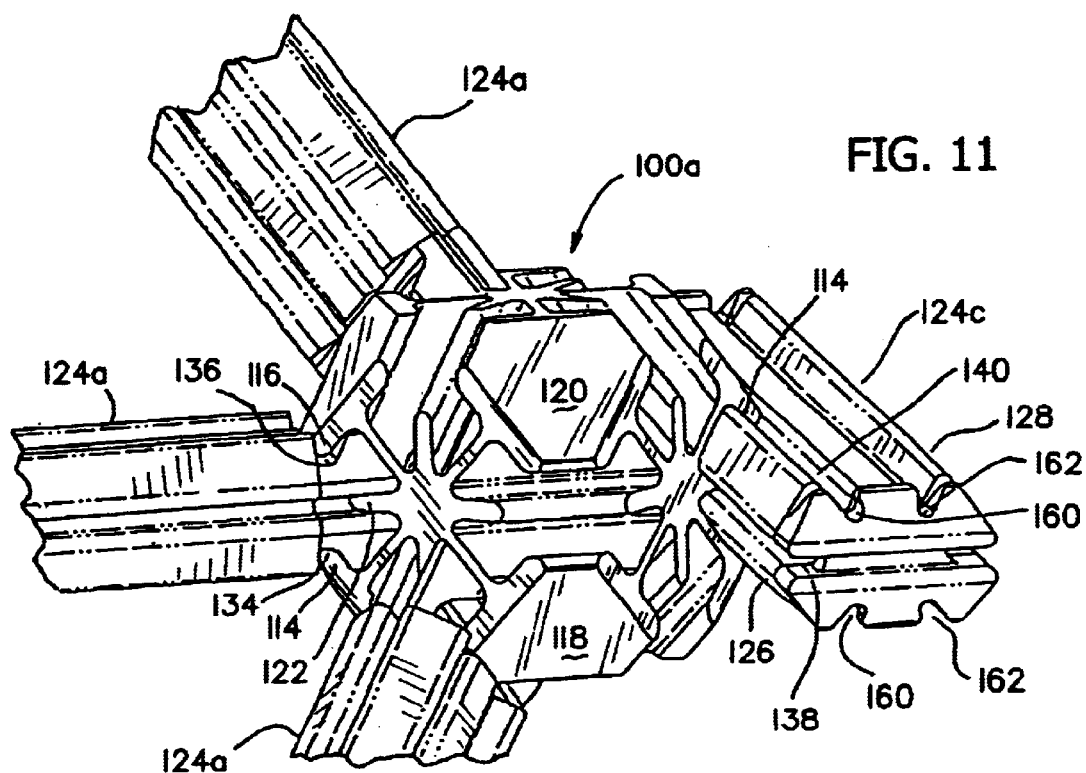
FIG. 11 is a perspective view of the hub of FIG. 9a having engaged therewith a plurality of strut members.

FIG. 11 illustrates the hub member 100a having connected thereto four struts. Three of the struts 124a are illustrated in FIG. 10a, while a modified strut 124c is connected along a lateral length 126. In particular, with respect to struts 124a, one end thereof of each is friction-fit engaged with a cavity 104a whereby the grooves 134, 136 slidingly engage the opposing flanges 114, 116 while the groove 148 engages the floor flange 122. As is apparent with respect to strut 124c, the lateral lengths 126, 128 function as an engageable portion substantially identical to the engageable portion of the ends of struts 124a and 124b. Thus, the floor flange 122 fits within the groove 138 while the opposing flanges 114, 116 (beneath the strut 124c) are accommodated by an inner-length groove 140. As shown, the end 150 has notches 160, 162 to thereby permit sliding engagement by the strut 124c of the opposing flanges 114, 116.

Figure 12:
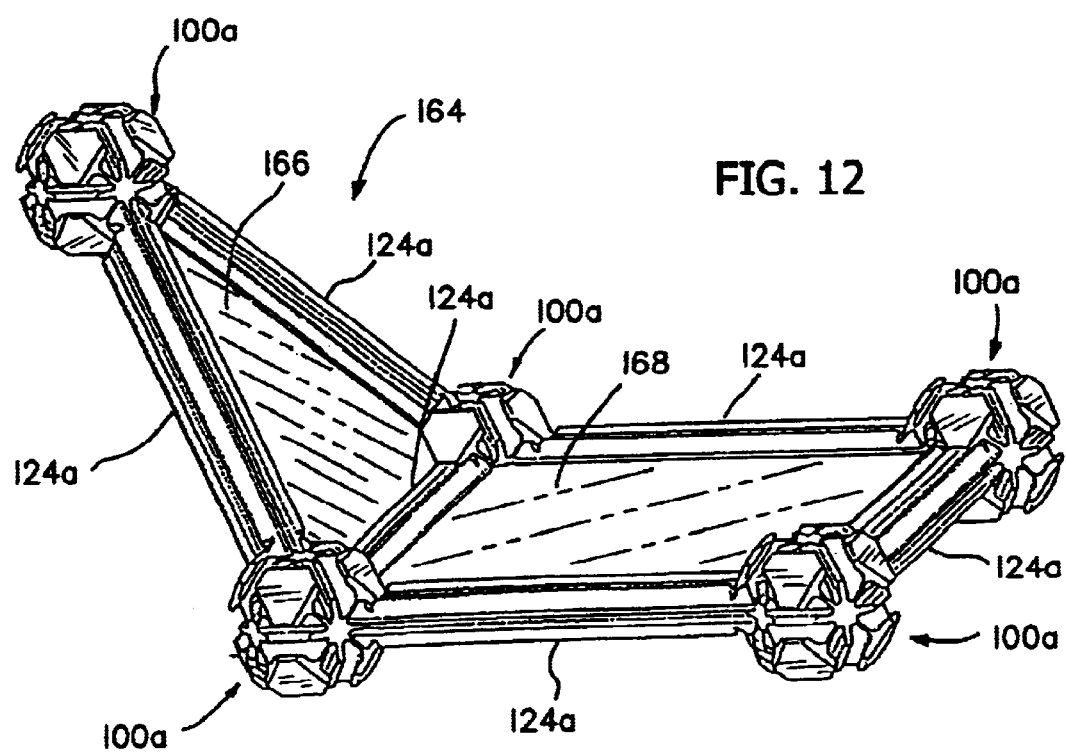
FIG. 12 is a perspective view of a modular structure employing hubs and struts of the second embodiment.

FIG. 12 illustrates a modular structure 164 constructed of five hub members 100a, six struts 124a, and two panels 166, 168. Each strut member 124a extends between two hub members 100a whose respective ends are engaged within respective cavities 104a as earlier described. The edges of the panel 166 are sized so as to be snapped into an inner-length groove 140, 142. Panel 168 is sized to slide within lateral groove 138 during assembly.

Figure 13:
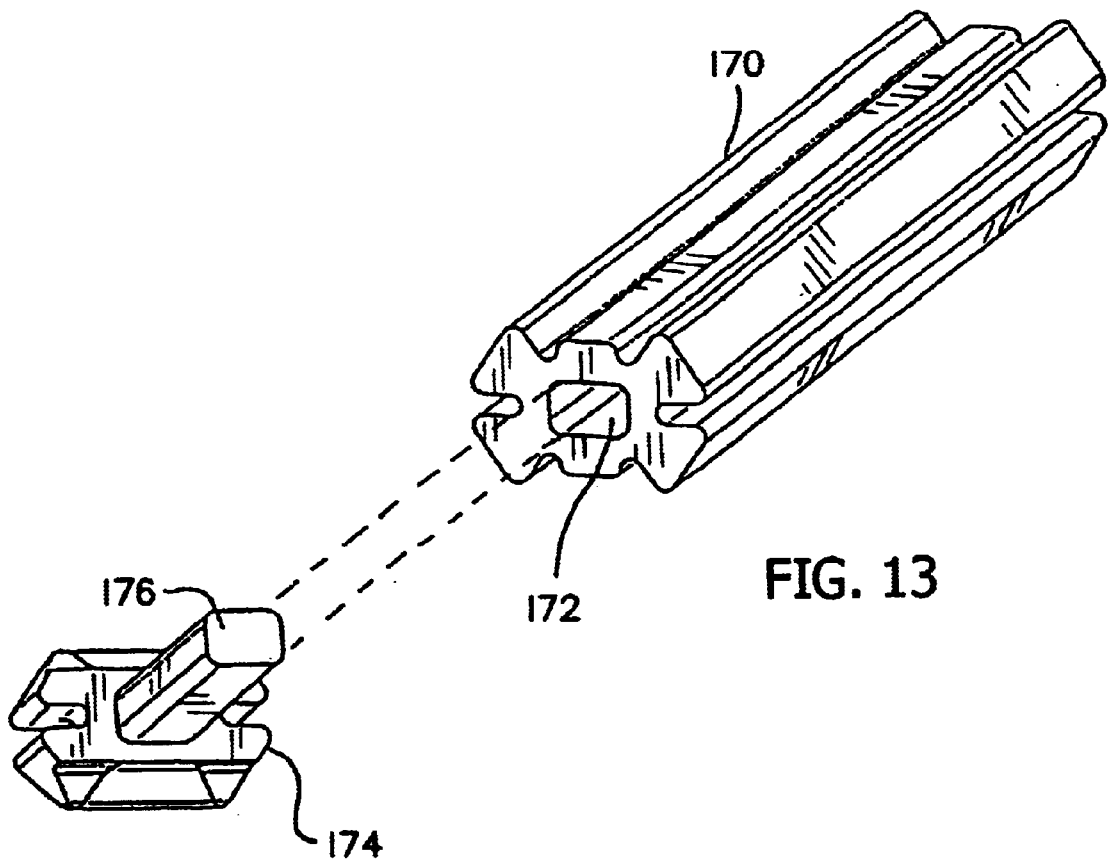

FIG. 13 is included to illustrate optional construction of a strut. In particular, a central strut portion 170 is provided with an axial opening 172, while an end piece 174 has a stem 176 that friction-fits within the opening 172. The end piece 174 is configured to be identical to end construction as that of the strut 124d.

Figure 14:
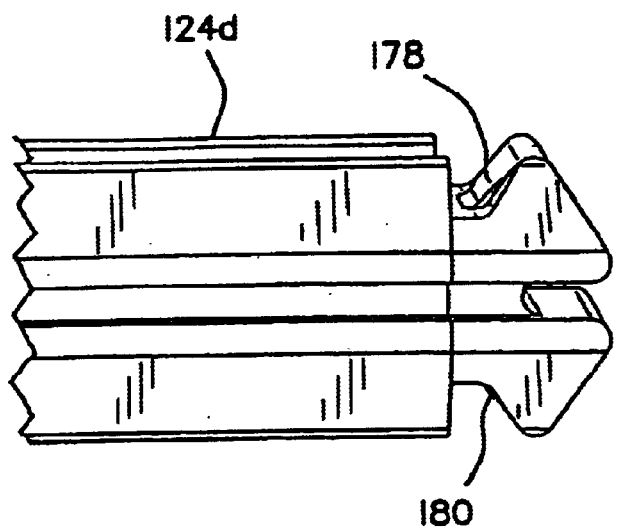

FIG. 14 illustrates another modification of the end of a strut 124d wherein frictional engagement of the strut end with the side walls 106, 108 of a cavity 104a, 104b is enhanced with added mass 178, 180 that functions during engagement with a hub member 100a, 100bto add significant pressure against the inside-of the flanges 114, 116 for a more secure engagement.

Figure 15A:
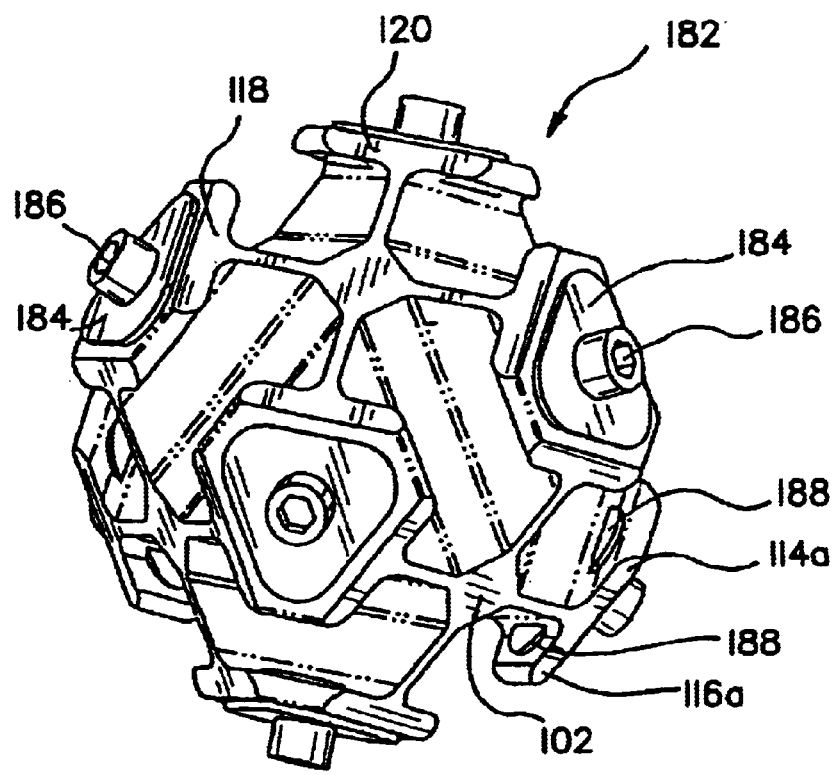
FIG. 15a is a perspective view of a modification of the hub member of FIG. 9b.
Figure 15B:
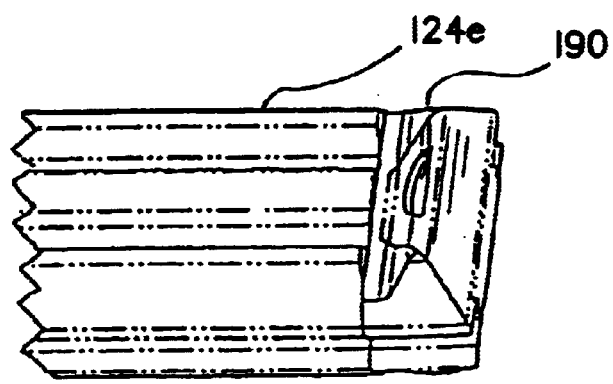
FIG. 15b is a perspective view of a portion of a modification of the strut of FIG. 10b.

Referring to FIGS. 15a and 15b, the former illustrates a modified hub member 182 constructed generally as the configuration of hub member 100b of FIG. 9, except with boltedly securable flange plates 118, 120 optionally operable with strut 124e of FIG. 15b. Specifically, the hub member 182 has exteriorly placeable metal plates 184 through which threaded bolts 186 can pass for subsequent entry into the core 102 of the hub member 182. When tightened, the metal plate 184 passes through the flanges 114, 116 such that respective bottom portions 188 thereof engage a slot 190 of respective cooperatively configured struts 124e to thereby effectuate a distribution throughout the hub member 182 of forces on the strut 124e during use while enhancing strut securement.

The above described modular structural system may alternatively be described as comprising a plurality of connector hub members 100a, 100b each having spherical symmetry and preferably conforming to the shape of an octahedron, and a plurality of strut members 124a, 124b and 124c each defining a strut length, which may be any selected length, and each having linear longitudinal symmetry, symmetry about the long or longitudinal axis of the strut members 124a, 124b and 124c, wherein, each of the connector hub members 100a, 100b provides a strut joining means, by which is meant all of the cavities 104a and 104b, adapted for receiving at least one of the strut members 124a, 124b and 124c, and each of the strut members 124a, 124b and 124c provides a hub joining means, by which is meant, specifically, the grooves 140, 142, 134, 136, 138, 148 adapted for engaging the strut joining means of at least one of the connector hub members 100a, 100b such that the strut members 124a, 124b and 124c are removably engagable with the connector hub members 100a, 100b in alternative first, see FIG. 11 at the left, and second, see FIG. 11 at the right, positions the strut members 124a, 124b and 124c in corresponding radial and tangential positions relative to the connector hub members 22.

Preferably, the hub joining means of the strut members 124a, 124b and 124c is engagable with the strut joining means of the connector hub members 100a, 100b, when positioning the strut members 124a, 124b and 124c for extending radially from the connector hub members 100a, 100b, through a joining motion path transverse to an axis of said linear longitudinal symmetry of the strut members 124a, 124b and 124c. This motion is critical to the enablement for assembling the various hubs and struts (pieces) of the invention since lateral motion allows connection of the pieces in a closed loop formation such as is shown in FIG. 12. In other construction schemes, shown in the prior art, this lateral connection approach is not provided so that certain parts, usually the struts, need to be deformed to accomplish a closed loop type of construction assembly. This lateral connection enablement is an novel aspect of the invention and its method.

Preferably, the hub joining means of the strut member 124c is engagable with the strut joining means of the connector hub members 100a, 100b, when positioning the strut member 124c for extending tangentially relative to the connector hub members 100a, 100b, through a joining motion path along an axis of said linear longitudinal symmetry of the strut member 124c. In other words the strut member 124c is joined by sliding motion to engage the hub members 100a, 100b, as shown in FIG. 11 on the right side.

Preferably, the hub joining means of the strut members 124a, 124b and 124c is adapted for receiving an edge of a panel 166 or 168 wherein the panel edge (peripheral edge) is fully engaged with the hub joining means along the entire strut length, i.e., as shown in FIG. 12 wherein the panel edge resides in groove 138, 140 or 142. It is important in the present invention that the panel 166 or 168 is fully engaged along its entire length providing strength, reluctance to disengage, and improved appearance. Preferably, the strut joining means of the connector hub members 100a, 100b each comprise a plurality of the slots, otherwise refered to herein as cavities 104a and 104b, preferably twelve slots (cavities), uniformly spaced about the connector hub members 100a, 100b with spherical symmetry as best seen in FIGS. 9a and 9b. This configuration allows strut members 124a, 124b and 124c to be joined with and extend away from a given one of the hub members 100a, 100b in four directions in a plane, and spaced with 90 angular degree separation, i.e., in quadrature. Additionally, four further strut members 124a, 124b and 124c may be joined with the same hub member 100a, 100b positioned at 45 angular degrees to the plane, clocked at +45 angular degrees to the first four strut members and rotated 90 degrees and in mutual quadrature. Finally, four still further strut members 124a, 124b and 124c may be joined with the same hub member 100a, 100b positioned at 45 angular degrees to the plane, clocked at –45 angular degrees to the first four strut members and rotated 90 degrees and in mutual quadrature so that the +45 degree strut members 124a, 124b and 124c and the –45 degree strut members 124a, 124b and 124c appear as mirror images to each other where the mirror is in the discussed plane. This is the preferred embodiment of the invention, but certainly other configurations may be evolved based on the above described 12 strut member configuration. These might include more or less strut attachment cavities place at selected angles and spacings to achieve an almost infinite variety of constuction capabilities.

As is evident, the above described construction provides for flexibility in design coupled with integrity of structure. While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A modular structural system comprising:
    a) at least one connector hub member comprising a core and a plurality of cavities arranged in a plurality of planes and each having first and second opposing side walls and a floor, with each cavity accessible through an open side thereof and having above said first and second side walls first and second opposing flanges projecting toward each other from respective first and second flange plates; and
    b) at least one strut member having two opposing lateral lengths and two opposing inner lengths between said lateral lengths, a first end, and a second end, with each end comprising an engageable portion disposed thereat for engagement of the strut within a cavity of the connector hub member, said engageable portion having first and second grooves to slidingly capture said first and second opposing flanges of the cavity and complimentary in shape to said first and second side walls and of a size to frictionally engage said side walls, with said strut member having a strut cross-sectional geometry substantially identical to and in alignment with the cross-sectional geometry of the floor of the cavity when the engageable portion of the end is engaged within the cavity.

2. A modular structural system as claimed in claim 1 wherein the floor of the cavity has projecting outwardly therefrom a floor flange and the engageable portion of the strut has therein a groove disposed to accept said floor flange.

3. A modular structural system as claimed in claim 1 wherein at least one lateral length of the strut additionally comprises an engageable portion.

4. A modular structural system as claimed in claim 3 wherein at least one inner length comprises at least one inner-length groove to accommodate an edge of a retained panel.

5. A modular structural system as claimed in claim 4 wherein the inner-length groove accommodates one of said first and second flanges of said cavity.

6. A modular structural system as claimed in claim 1 wherein at least one inner length comprises at least one inner-length groove to accommodate an edge of a retained panel.

7. A modular structural system as claimed in claim 1 wherein the flange plates of the connector-hub member are adjustably boltedly secured to the core.

8. A modular structural system as claimed in claim 1 wherein the engageable portion disposed at the end of the strut is removable therefrom.

9. A modular structure comprising:
a) a plurality of connector hub members each comprising a core and a plurality of cavities arranged in a plurality of planes and each having first and second opposing side walls and a floor, with each cavity accessible through an open side thereof and having above said first and second side walls, first and second opposing flanges projecting toward each other from respective first and second flange plates; and
b) a plurality of strut members each having two opposing lateral lengths and two opposing inner lengths between said lateral lengths, a first end, and a second end, with each end comprising an engageable portion disposed thereon for engagement of the strut within a cavity of the connector hub member, said engageable portion having first and second grooves to slidingly capture said first and second opposing flanges of the cavity and complimentary in shape to said first and second side walls and of a size to frictionally engage said side walls, with said strut member having a strut cross-sectional geometry substantially identical to and in alignment with the cross-sectional geometry of the floor of the cavity when the engageable portion of the end is engaged within the cavity.

10. A modular structure as claimed in claim 9 wherein each said floor of each said cavity has projecting outwardly therefrom a floor flange and the engageable portion of the strut has therein a groove disposed to accept said floor flange.

11. A modular structure as claimed in claim 9 wherein at least one lateral length of each strut additionally comprises an engageable portion.

12. A modular structure as claimed in claim 11 wherein at least one inner length of each strut comprises at least one inner-length groove to accommodate an edge of a retained panel.

13. A modular structure as claimed in claim 12 wherein said inner-length groove accommodates one of said first and second flanges of said cavity.

14. A modular structure as claimed in claim 9 wherein at least one inner length of each strut comprises at least one inner-length groove to accommodate an edge of a retained panel.

15. A modular structure as claimed in claim 14 additionally comprising a retained panel.

16. A modular structural system as claimed in claim 9 wherein the flange plates of each connector hub member are adjustably boltedly secured to the core.

17. A modular structural system as claimed in claim 9 wherein the engageable portion disposed at the end of each strut is removable therefrom.

18. A modular structural system comprising a plurality of connector hub members each having spherical symmetry, and a plurality of strut members each defining a strut length and each having linear longitudinal symmetry, wherein each of the connector hub members provides strut joining structure adapted for receiving at least one of the strut members, and each of the strut members provides hub joining structure adapted for engaging the strut joining structure of at least one of the connector hub members, such that the strut members are removably engageable with the connector hub members in alternative first and second positions, placing the strut members in corresponding radial and tangential positions relative to the connector hub members, the hub joining structure of the strut members being adapted for receiving an edge of a panel, wherein the panel edge is engaged with the hub joining structure when the modular structural system is in an assembled state.

19. A modular structural system as claimed in claim 18 wherein the hub joining structure of the strut members is engageable with the strut joining of the connector hub members, when positioning the strut members for extending radially from the connector hub members, through a joining motion path transverse to an axis of said linear longitudinal symmetry of the strut members.

20. A modular structural system as claimed in claim 18 wherein the hub joining structure of the strut members is engageable with the strut joining of the connector hub members, when positioning the strut members for extending tangentially relative to the connector hub members, through a joining motion path along an axis of said linear longitudinal symmetry of the strut members.

21. A modular structural system as claimed in claim 18, wherein the panel edge is fully engaged with the hub joining structure along the entire strut length.

22. A modular structural system as claimed in claim 18 wherein the strut joining structure of the connector hub members each comprise a plurality of slots uniformly spaced about the connector hub members with spherical symmetry.

23. A modular structural system as claimed in claim 22 wherein the plurality of slots comprises twelve slots.

24. A modular structural system as claimed in claim 18 wherein each of the connector hub members conforms to an octahedron.

25. A modular structural system comprising a plurality of connector hub members each having spherical symmetry, and a plurality of strut members each defining a strut length and each having linear longitudinal symmetry, wherein each of the connector hub members provides a strut joining means adapted for receiving at least one of the strut members, and each of the strut members provides a hub joining means adapted for engaging the strut joining means of at least one of the connector hub members, such that the strut members are removably engageable with the connector hub members in alternative first and second positions, placing the strut members in corresponding radial and tangential positions relative to the connector hub members, wherein the hub joining means of the strut members is adapted for receiving an edge of a panel, and wherein the panel edge is fully engaged with the hub joining means along the entire strut length.

* * * * *

UNITED STATES PATENT AND TRADEMARK OFFICE
CERTIFICATE OF CORRECTION

PATENT NO.      : 6,622,447 B1
DATED           : September 23, 2003
INVENTOR(S)     : Steven Crawford Kessler It is certified that error appears in the above-identified patent and that said Letters Patent is hereby corrected as shown below:

Column 1,
Line 8, after "120", add the word -- of co-pending --.
Line 10, after "120 of", add the word -- co-pending --.

Column 4,
Line 56, after "areas", add -- 20 --.

Column 5,
Line 28, after "225 degree," change "45 degree" to -- -45 degree --.

Signed and Sealed this

Twenty-second Day of June, 2004

JON W. DUDAS
*Acting Director of the United States Patent and Trademark Office*